United States Patent [19]
Bigelow et al.

[11] Patent Number: 5,951,135
[45] Date of Patent: Sep. 14, 1999

[54] COLOR IMAGE PROJECTION SYSTEM

[75] Inventors: John E. Bigelow, Rexford, N.Y.; Philip J. Jones, Marlborough, United Kingdom

[73] Assignee: Raychem Corporation, Menlo Park, Calif.

[21] Appl. No.: 08/949,369

[22] Filed: Oct. 14, 1997

[51] Int. Cl.⁶ .......................... G03B 21/26; G03B 21/00
[52] U.S. Cl. .................................. 353/30; 353/31
[58] Field of Search .................. 353/30, 31, 33, 353/34, 38, 37, 81; 349/5, 7, 8; 359/621, 622, 619

[56] References Cited

U.S. PATENT DOCUMENTS

| | | | |
|---|---|---|---|
| 3,932,027 | 1/1976 | Cook et al. | 350/173 |
| 4,687,301 | 8/1987 | Ledebuhr | 350/401 |
| 4,913,528 | 4/1990 | Hasegawa | 350/286 |
| 4,938,032 | 7/1990 | van den Brandt | 353/30 |
| 4,943,154 | 7/1990 | Miyatake et al. | 353/31 |
| 4,943,155 | 7/1990 | Cross, Jr. | 353/33 |
| 4,969,730 | 11/1990 | Van Den Brandt | 353/31 |
| 5,098,183 | 3/1992 | Sonehara | 353/31 |
| 5,105,265 | 4/1992 | Sato et al. | 358/60 |
| 5,130,826 | 7/1992 | Takanashi et al. | 359/40 |
| 5,172,222 | 12/1992 | Plantier et al. | 358/61 |
| 5,172,254 | 12/1992 | Atarashi et al. | 359/41 |
| 5,307,185 | 4/1994 | Jones et al. | 359/41 |
| 5,357,289 | 10/1994 | Konno et al. | 348/757 |
| 5,398,081 | 3/1995 | Jones | 348/742 |
| 5,719,706 | 2/1998 | Masumoto et al. | 359/622 |
| 5,760,850 | 6/1998 | Nakanishi et al. | 349/5 |

FOREIGN PATENT DOCUMENTS

| | | |
|---|---|---|
| 0362776 A3 | 4/1990 | European Pat. Off. . |
| 0537708 A1 | 4/1993 | European Pat. Off. . |
| 2226174 | 6/1990 | United Kingdom . |
| WO 90/05429 | 5/1990 | WIPO . |
| WO 96/13943 | 5/1996 | WIPO . |
| WO 98/07061 | 2/1998 | WIPO . |
| WO 98/14012 | 4/1998 | WIPO . |

*Primary Examiner*—Eddie C. Lee
*Assistant Examiner*—Nguyen-Hung Henry
*Attorney, Agent, or Firm*—Herbert G. Burkard; Yuan Chao

[57] ABSTRACT

A system and method for projecting a color image is disclosed. The system includes a light dispersing system arranged in the path of a composite light beam for separating the composite light beam into spatially separated component beams, an image display arranged in the path of the component beams for producing modulated component beams, and a beam merging system producing a second light beam by merging the modulated component beams. The method includes producing spatially separated component light beams, directing the spatially separated component light beams to the surface of an image display, modulating display cells of the image display, and producing modulated component light beams.

24 Claims, 6 Drawing Sheets

COLOR IMAGE PROJECTION SYSTEM

BACKGROUND OF THE INVENTION

The disclosed invention relates to a color image projection system.

Color dispersement and recombination are important aspects of color projection systems. In such projection systems, white light is created from, for example, a halogen lamp or an arc lamp. A prism or other such device is used to disperse the white light into three separate color component beams: a red beam, a green beam, and a blue beam. These beams may be directed to three separate liquid crystal image displays that each include numerous individually addressable display cells. The display cells selectively modulate, i.e., interfere with or reflect, a color component beam thus imparting an image to the color beam. The reflected beams are recombined, and when projected on a screen form a full color image. The image displays are often active matrix image displays with display cells arranged in rows and columns. Typically, multiple image displays, one for each light component beam, are used, adding significantly to color projection system costs.

Figure 1:
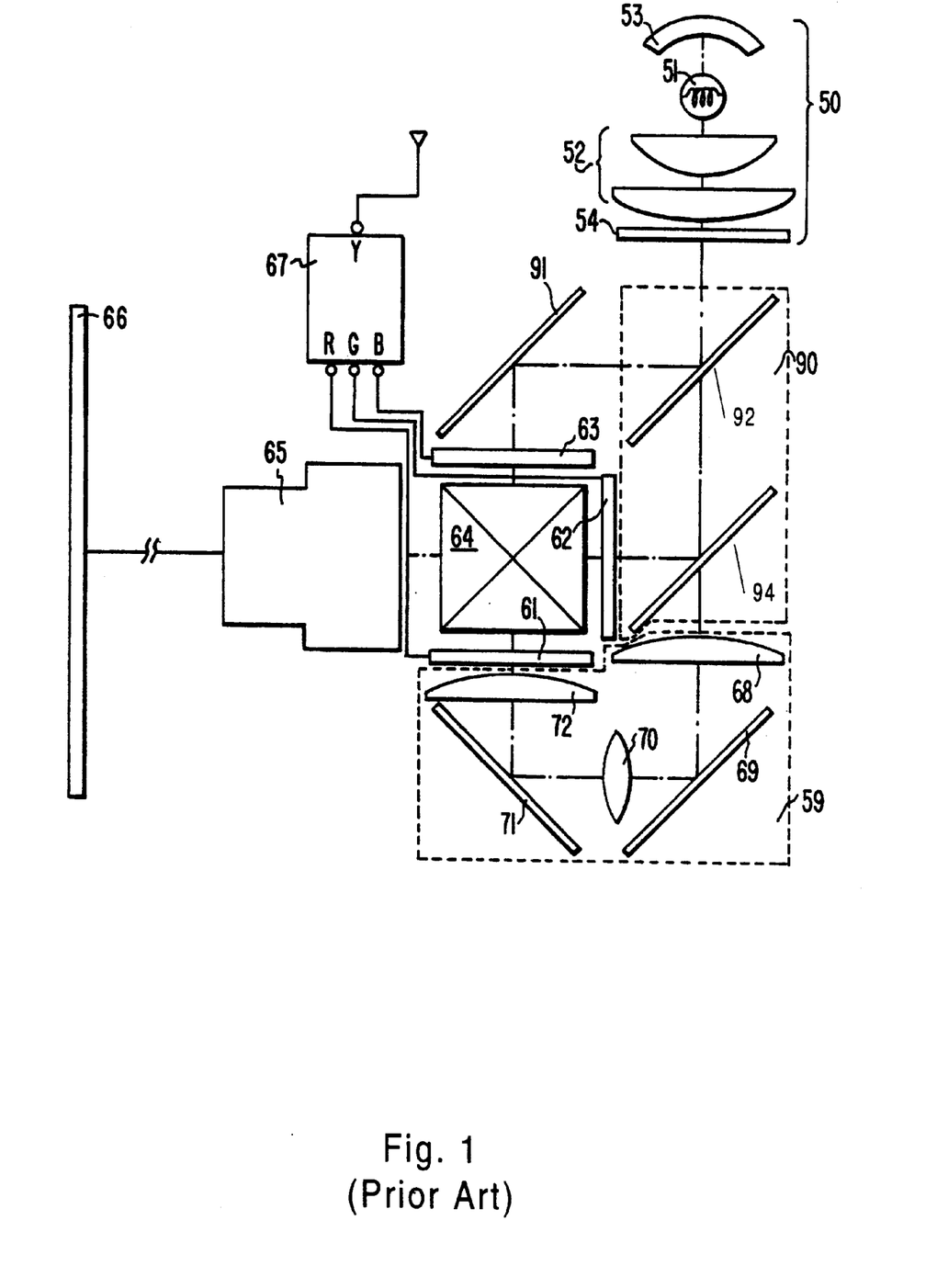
FIG. 1 is a diagram of the top view of a prior art projection system.

U.S. Pat. No. 4,943,154, issued Jul. 24, 1990, discloses a prior art projection system. As shown in FIG. 1, this system comprises a light source 50; light transmitter light valves 61, 62 and 63; a light combiner 64; a projection lens 65; a drive circuit 67; an input side convergent lens 68; an input side plane mirror 69; a central convergent lens 70; an output side plane mirror 71; and an output side convergent lens 72. The light source 50 comprises a lamp 51, a condenser lens 52, a concave mirror 53, and a heat absorbing filter 54. The lamp 51 radiates a white light containing the three primary colors of red, green and blue. Rays of the radiant light from the lamp 51 are arranged in approximately parallel rays by the condenser lens 52 and the concave mirror 53. More specifically, the rays of light from the center of a luminous element 55 in the lamp 51 are transmitted in parallel to the optical axis 57 by the condenser lens 52. Infrared rays are eliminated from the light rays passed through the condenser lens 52 by the heat absorbing filter 54. The light rays from the light source 50 are separated into beams of red, green and blue light.

A light separator 90 is used to disperse the light from light source 50 into colored beams of red, green and blue. The separator 90 is shown having two plates 92 and 94. Plate 92 has a low transmissivity for blue light but a high transmissivity for green and red. Plate 94 has a low transmissivity for blue and green light but a high transmissivity for red. Put another way, plate 92 reflects the blue light but transmits green and red. Of the green and red light that remains, plate 94 reflects the green but transmits the red. Thus, the two plates may be used to disperse the light before the light enters light valves 61, 62 and 63. As such, red light enters the red light valve 61. Green light is similarly transmitted to the green light valve 62, and blue light is transmitted to the blue light valve 63.

The light valves 61, 62 and 63 are liquid crystal panels each having matrix electrodes. Such panels generally have a plurality of display cells which change from a more scattering state to a less scattering state upon application of an input such as an electric field, magnetic field, etc. The drive circuit 67 produces electric signals R, G and B according to a video signal Y to control the transmittance of pixels in respective light valves 61, 62 and 63. The modulated light outputs from the light valves 61, 62 and 63 are then combined into a composite flux of light substantially to reproduce a color picture and project, by the projection lens 65, an enlarged image of the picture to a screen 66.

BRIEF SUMMARY OF THE INVENTION

In general, in one aspect, the invention features an image projection system. The system includes a light dispersing system arranged in the path of a composite light beam. The light dispersing system separates the composite light beam into a first component beam having a first spectra, a second component beam having a second spectra, and a third component beam having a third spectra. An image display is arranged in the path of the first, second, and third component beam. The image display includes a first display cell modulating the first component beam, a second display cell modulating the second component beam, and a third display cell modulating the third component beam. A beam merging system produces a second light beam by merging the modulated first component beam, modulated second component beam, and modulated third component beam.

Implementations of the invention may include one or more of the following features. The image projection system may include a light source assembly for producing the composite light beam and a projection lens system arranged in the path of the second light beam. The image display may include display cells which change from a more scattering state to a less scattering state upon application of an input or may include display cells which change from a more opaque state to a less opaque state upon application of an input. The image display system may include display cell modulation circuitry. The axis of the first light beam and the axis of the second light beam may not be parallel. The light dispersing system may include a prism, or may include two prisms that function together as a zero deviation prism. The light dispersing system may include a lenticular screen. Additionally, the light dispersing system and the component beam merging system may be a single system.

In general, in another aspect, the invention features a method of projecting a color image. The method includes dispersing a composite light beam to produce a spatially separated first, second, and third component beam having, respectively, a first, second, and third spectra. The first, second, and third component beams are directed to, respectively, a first, second, and third display cell on the surface of the image display. The first, second, and third display cells are each modulated to produce a first, second, and third modulated component beam. A second light beam is produced by merging the first, second, and third modulated component beams.

Implementations of the invention may include one or more of the following features. Dispersing the first light beam may include dispersing the first light beam using a prism. Directing the spatially separated component light beams may include directing the spatially separated component light beams using a lenticular screen. Modulating display cells may include altering display image cell states between a more scattering state and a less scattering state. Producing a second light beam may include producing a second light beam by merging modulated component light beams reflected by the image display. Modulating display cells may include altering display cell states between a more opaque state and a less opaque state. Producing a second light beam may include producing the second light beam by merging modulated component light beams passing through the image display.

Advantages of aspects of the invention can include one or more of the following. A color image projection system using a single image display can be implemented. Use of a single image display enables a single set of image optics thereby decreasing cost and complexity of the projector construction. The optical system does not require color component filters, thus allowing for increased source light utilization and thereby allowing for a brighter picture from a given light source. The present invention allows both transmissive and reflective systems to be implemented.

Thus, in one embodiment the present invention provides an image projection system, comprising:

a light dispersing system arranged in the path of a composite light beam for separating the composite light beam into a first component beam having a first spectra, a second component beam having a second spectra, and a third component beam having a third spectra;

an image display arranged in the path of the first component beam, second component beam, and third component beam, the image display comprising a first display cell modulating the first component beam, a second display cell modulating the second component beam, and a third display cell modulating the third component beam; and a beam merging system producing a second light beam by merging the modulated first component beam, modulated second component beam, and modulated third component beam.

In a second embodiment the present invention provides a method of projecting a color image comprising:

dispersing a composite light beam to produce a spatially separated first component beam, second component beam, and third component beam wherein the first component beam has a first spectra, the second component beam has a second spectra, and the third component beam has a third spectra;

directing the first component beam to a first display cell on the surface of an image display;

directing the second component beam to a second display cell on the surface of the image display;

directing the third component beam to a third display cell on the surface of the image display;

modulating the first display cell to produce a first modulated component beam;

modulating the second display cell to produce a second modulated component beams;

modulating the third display cell to produce a third modulated component beam; and producing a second light beam by merging the first modulated component beam, the second modulated component beam, and the third modulated component beam.

Other advantages and features will become apparent from the following description and from the claims.

DETAILED DESCRIPTION OF THE INVENTION

Figure 2:
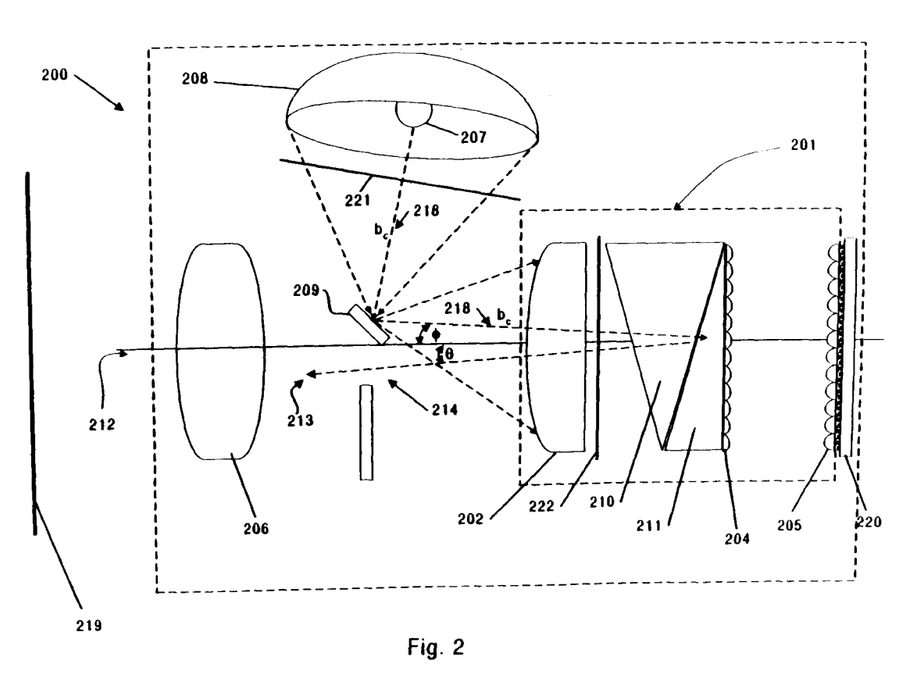
FIG. 2 is a schematic side view of a reflective color image projection system.

FIG. 2 illustrates a reflective color image projection system 200. The image projection system 200 has a light source assembly that includes a light source 207, and may include an elliptical reflector 208 and a mirror 209 for directing light from light source 207 to the surface of lens 202. Mirror 209 may be replaced with other reflective elements or even refractive elements as long as these elements have the capability of redirecting light. Additionally, light filtering and heat shielding elements 221 may be present.

The image projection system 200 also includes a light dispersing and component beam merging system 201 that includes condenser lens 202, prisms 210 and 211, and lenticular screens 204 and 205. The system 201 may also include light filtering elements 222. The dispersing and merging system 201 separates a composite light beam (i.e., a "white" light beam) originating at light source 207 into color component light beams (i.e., red, green, and blue light beams), and directs the color component light beams to an image display system 220 where the component light beams are modulated with image information and reflected back through the system 201 for projection through lens 206 onto a screen 219.

In the image projection system 200, light originating at light source 207, is collected by an elliptical reflector 208, and is focused on mirror 209. Mirror 209 is set at an angle so as to direct light from the light source 207 to condenser lens 202 along an incoming light path having a central axis 218. The central axis 218 of the incoming light is at an angle $\phi$ to an optical axis 212. The optical axis 212 bisects the axis 218 and the axis 213 of light exiting the condenser lens 202 toward the projection lens system 206. The angular difference between the incoming light axis 218 and the optical axis 212 results in the separation of the light heading towards the image display 220 from that being reflected by the image display and exiting along outgoing light axis 213.

The angle $\phi$ between the incoming light axis 218 and the optical axis 212 is determined, in part, by characteristics of the light source 207 and the image display 220. In particular, as the light emitting area of light source 207 approaches that of a theoretical point source of light, the collimation of light by lens 202 will be improved and the angle $\phi$ may be reduced. For example, in an image projection system 200 having an image display 220 with a one inch diameter and an arc lamp light source 207 with a light producing element length of one millimeter, the angle $\phi$ may be between one-half and three degrees.

Figure 3:
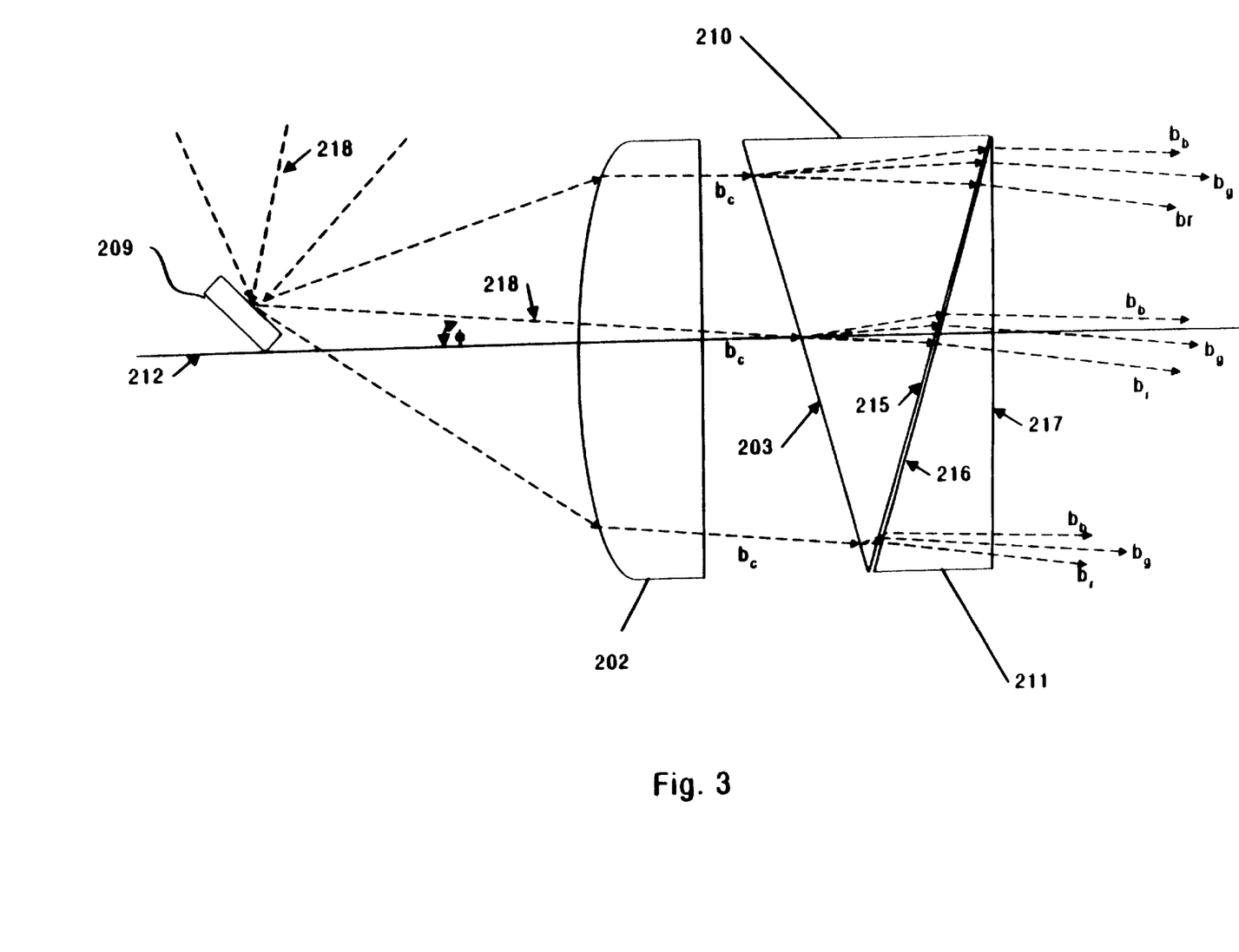
FIG. 3 is a schematic view of a portion of a reflective color image projection system.

FIG. 3 is a partial schematic view illustrating the mirror 209, condenser lens 202, first prism 210 and second prism 211 of the color image projection system 200. Referring to FIGS. 2 and 3, composite light from light source 207 enters condenser lens 202 along axis 218. Condenser lens 202 functions to collimate the light from light source 207 resulting in substantially parallel beams of composite light bc being directed to surface 203 of prism 210.

Prism 210 is made of an optical material that has substantial dispersion (i.e., its refractive index varies strongly and monotonically from red to blue wavelengths). Prism 210 separates the composite light beam bc entering at prism surface 203 into distinct component color beams, $b_r$, $b_g$, $b_b$ that include, respectively, red, green and blue frequency spectra. Filter element 221 may include, for example, cyan and magenta notch filters to improve separation of composite light into distinct color components.

Light exiting the prism face 215 is substantially collimated with light of like-frequencies, but will differ in direction from light with differing frequency components. Thus, for example, red component color beams, $b_r$, will be substantially collimated with other red beams but will differ in direction from, for example, blue component color beams, $b_b$. Red, green, and blue color component beams $b_r$, $b_g$, and $b_b$ exiting prism surface 215 enter prism 211 along surface 216. Prism 211 minimizes the angular deviation of the red, green, and blue component light beams, $b_r$, $b_g$, $b_b$, from the optical axis 212 while maintaining angular separation of the light beams, $b_r$, $b_g$, $b_b$. To counter these angular deviations of the red, green, and blue component light beams caused by prism 210, prism 211 is formed of an optic material having substantially less dispersion than that of prism 210.

The combination of prism 210 and 211 is referred to as a "zero deviation prism." With respect to the green component, $b_g$, the prism 211 counters the angular deviation produced by prism 210 such that the green light beam, $b_g$, emerging from prism 211 is at substantially the same angle $\phi$ with respect to the optical axis 212 as is composite light, $b_c$, entering the condenser lens 202. However, red light components, $b_r$, will have a smaller angle to the optical axis 212 and blue light components, $b_b$, will have a larger angle to the optical axis 212 after passing through prisms 210 and 211. The optical properties of prisms 210 and 211 need not be as illustrated in the example embodiment 200, for example, a color image projection system may include a prism 211 having substantial dispersion and a prism 210 being less dispersive than prism 211.

Figure 4:
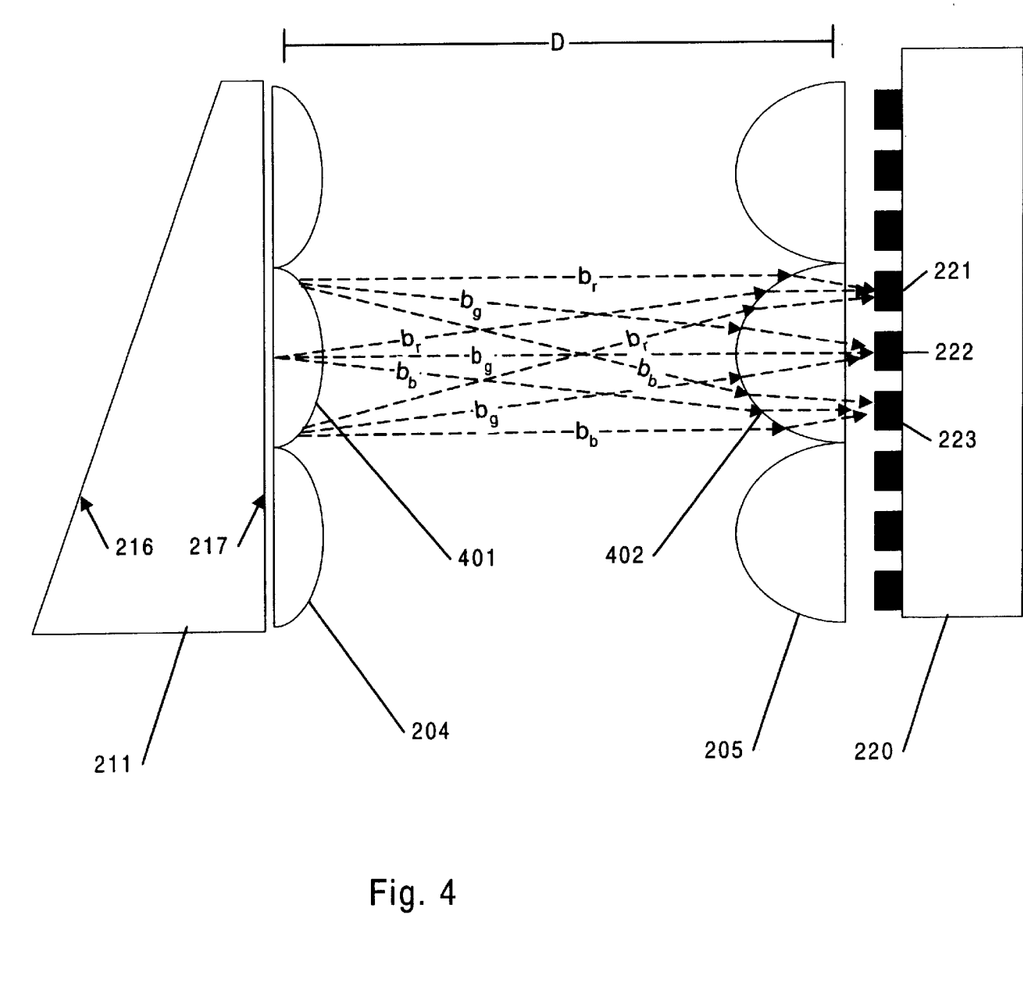
FIG. 4 is a schematic view of a portion of a prism, lenticular screens, and image display system in a color image projection system.

FIG. 4 is an enlarged view of a section of prism 211, lenticular screens 204 and 205, and image display system 220 of the color projection system 200 (FIG. 2). Referring to FIGS. 2 and 4, after exiting prism face 217, component light beams $b_r$, $b_g$, $b_b$ are directed to lenticular screen 204. A lenticular screen is composed of numerous small lenses ("lenslets") that may be, for example, cylindrical, rectangular-cylindrical, or conical in shape. Lenticular screen 204 converges and directs beams $b_r$, $b_g$, $b_b$ to the second lenticular screen 205 such that each lenslet in 205 receives the light from a particular lenslet in screen 204. For example, lenslet 402 receives light from lenslet 401.

Lenticular screens 204 and 205 are separated by a distance, D (FIG. 4). The distance, D, between lenticular screens 204 and 205 is chosen such that a particular band of light, for example, the green band $b_g$ from lenslet 401 on lenticular screen 204, illuminates approximately one-third of a corresponding lenslet 402 on lenticular screen 205 and is focused on a display cell such that as the light is reflected from the display cell it will follow a mirror image path back through lenticluar screen 204 with respect to its normal of the image display cell.

Because of their angular separation, the red, green, and blue beams, $b_r$, $b_g$, $b_b$, are brought to a focus position on the image display system 220 that is different for each of the beams, $b_r$, $b_g$, $b_b$. Thus, lenticular screens 204 and 205 can be used to focus the angularly separated but substantially collimated light beams, $b_r$, $b_g$, $b_b$, emerging from prism face 217, onto individual display cells on the image display 220.

Figure 5:
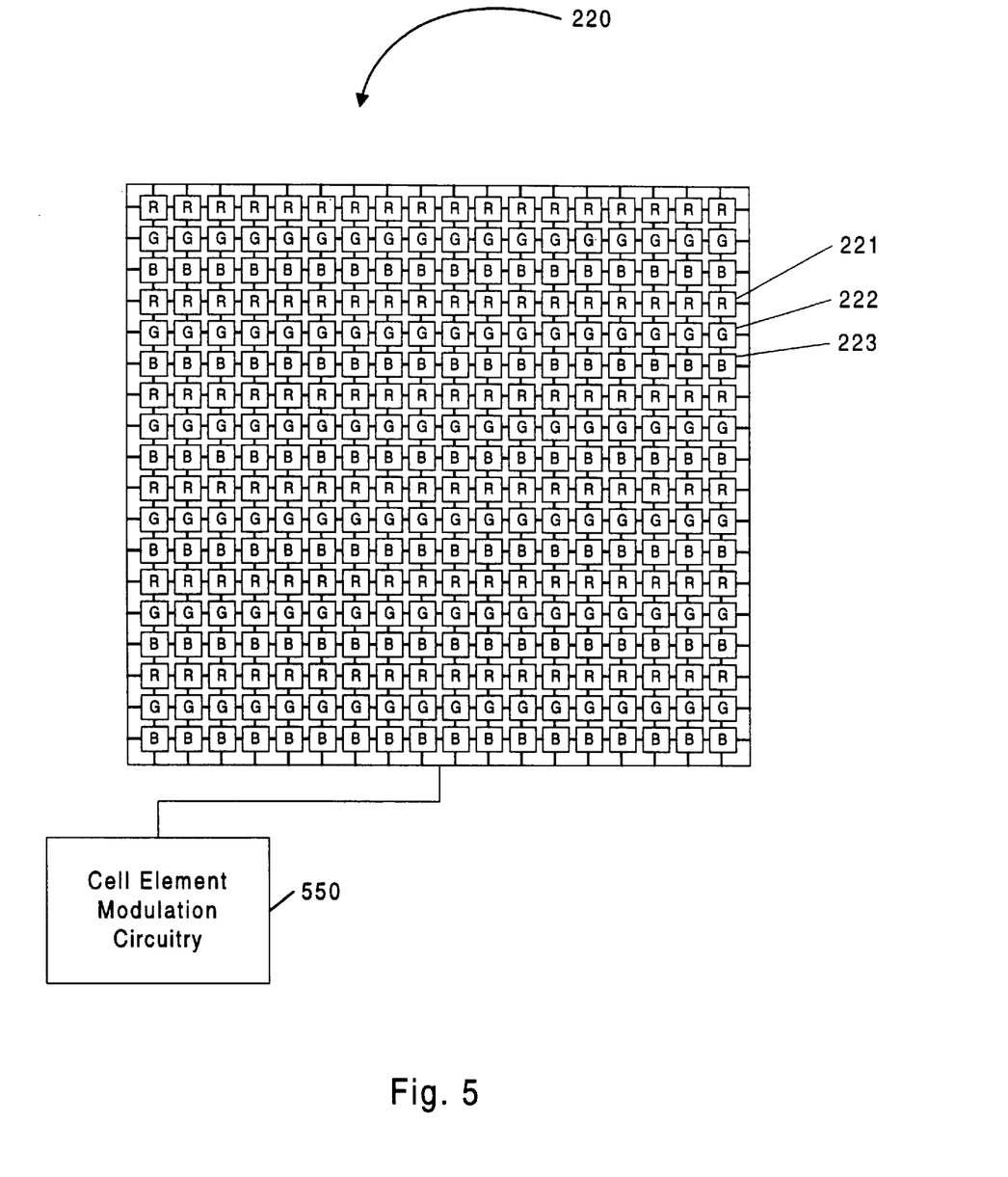
FIG. 5 is a schematic view of an image display.

FIG. 5 illustrates an image display. An image display 220 is composed of rows and columns of display cells, for example, display cells 221, 222 and 223. Display cells can be individually modulated with color component information by modulation circuitry 550. For example, cell 221 may be modulated with red image information, cell 222 may be modulated with green image information, and cell 223 may be modulated with blue image information. By modulating the numerous display cells in an image display 220, an image can be represented. The illustrated image display 220 includes eighteen rows and eighteen columns of display cells. Implementations of an image display 220 may include many hundreds or thousands of rows and columns of display cells.

Referring back to FIG. 2, in the image projection system 200, the image display 220 has display cells that can be individually modulated between a reflecting state and a nonreflecting or scattering state. Light focused by lenticular screen 205 onto display system 220 is reflected by display cells that are in a reflecting state. The reflected light (not explicitly illustrated), now modulated with image information, is returned at a return angle that is approximately a negative of the angle made by the incident light beams, $b_r$, $b_g$, $b_b$, with the normal of the image display 220 surface. The reflected light beams pass back through lenticular lens arrays 205 and 206 and will be brought into coincidence by the combination of prisms 210 and 211. The reflected light beams subsequently emerge from condenser lens 202 along an exit axis 213. Axis 213 is at a negative angle $\theta$ with respect to the optical axis 212, resulting in the reflected light beams being brought to a focus at the exit aperture 214, on their way to projection lens 206. The projection lens 206 produces on the screen 219 an image of the lenslets in the lenticular screen 204 colored by the light beams passing through them as modulated and reflected by the image display 220.

Figure 6:
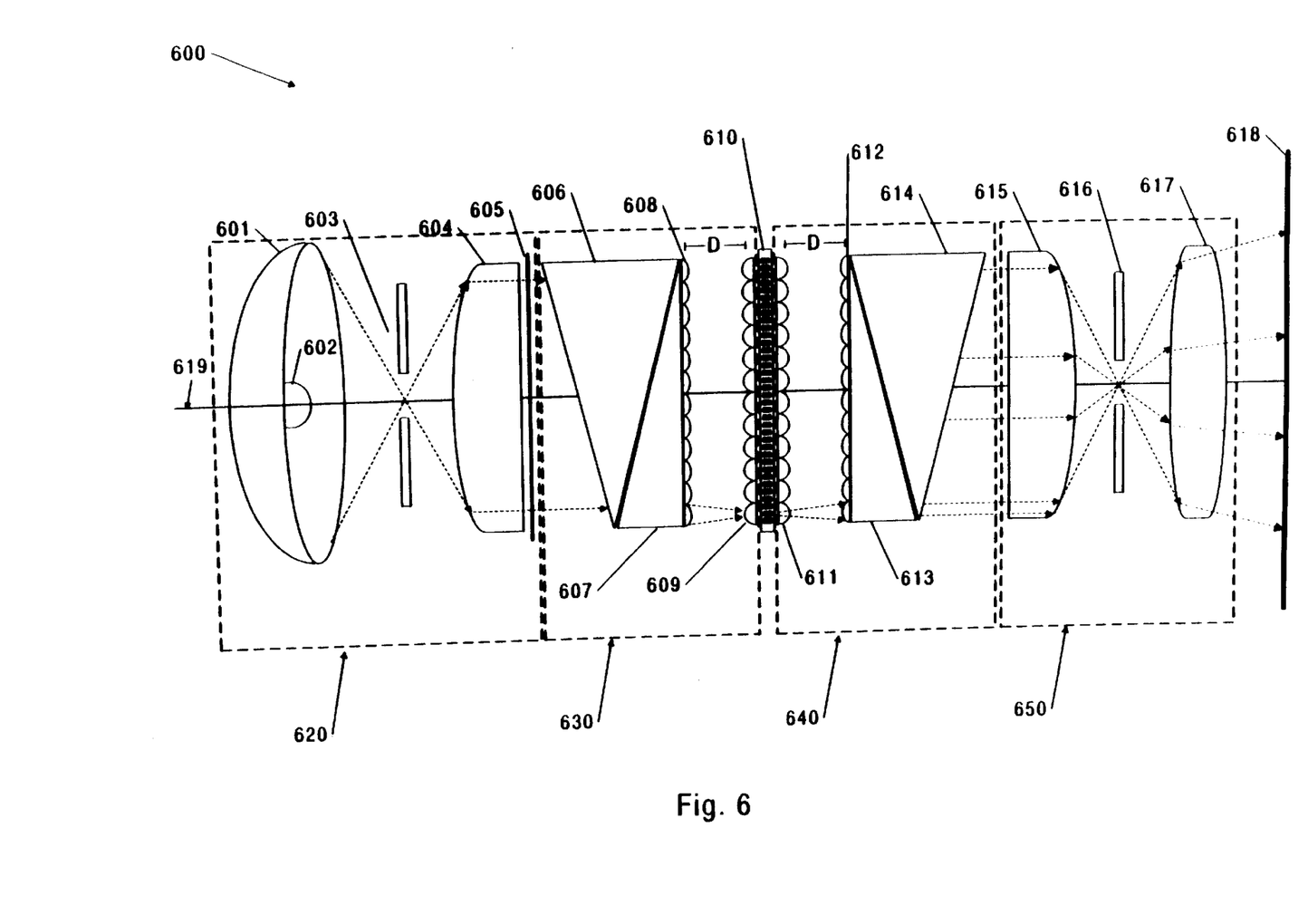
FIG. 6 is a schematic side view of a transmissive color image projection system.

A transmissive color image projection system may also be implemented. FIG. 6 illustrates a transmissive image projection system. The image projection system 600 has a light source assembly 620 that includes a light source 602, and may include an elliptical reflector 601 for directing light from light source 601 through an aperture 603 to the surface of a condenser lens 604. Reflector 601 may be replaced by a parabolic lamp and mirror assembly that produces collimated light, in which case, condenser lens 604 and aperture 603 may be omitted. The system 620 may include light filtering and heat shielding elements 605.

The image projection system 600 further includes a light dispersing system 630 and a component beam merging system 640. The light dispersing system 630 includes prisms 606 and 607, and lenticular screens 608 and 609. The dispersing system 630 separates a composite light beam (i.e., a "white" light beam) originating at light source 602 into color component light beams (i.e., red, green, and blue light beams), and directs the color component light beams to display cells of a transmissive image display 610. The transmissive image display 610 is composed of numerous display cells that may be individually modulated between transparent and opaque states.

The component beam merging system 640 merges modulated red, green, and blue color component beams into coherent beams of light. The merging system 640 includes lenticular screens 611 and 612 and prisms 613 and 614. The merging system 640 merges the color component light beams (i.e., red, green, and blue light beams) that pass through the image display 610 and directs them to a projector lens assembly 650. Components of beam merging system 640 may be substantially identical to those of dispersing system 630, but arranged so as to function in opposition to the system 630. That is, prisms 606 and 614 may be physically identical, as may prisms 607 and 613, lenticular screens 608 and 612, and lenticular screens 609 and 611.

In the image projection system 600, light originating at light source 602, is collected by an elliptical reflector 601 and is directed to condenser lens 604 through aperture 603. The central axis of light directed to the condenser lens 604 may be aligned with the optical axis. The condenser lens 604 functions to produce collimated composite light resulting in substantially parallel beams of composite light bc being directed to prism 606.

Prism 606 is made of an optical material that has substantial dispersion (i.e., its refractive index varies strongly and monotonically from red to blue wavelengths). Prism 606 separates the composite light beams bc entering the prism 606 into distinct component color beams, $b_r$, $b_g$, $b_b$ that include, respectively, red, green and blue frequency spectra. Notch filters, for example, filter 605, may be used to remove cyan and magenta from the composite light and thereby improve separation of composite light into distinct red, green, and blue bands of light.

The light beams, $b_r$, $b_g$, $b_b$, exiting prism 606 are directed to prism 607 and are substantially collimated with beams having like-frequency color components. Thus, for example, red component color beams, $b_r$, will be substantially collimated with other red beams. However, the color component beams are not necessarily collimated with beams having differing-frequency color components. Color component beams enter prism 607 which functions to minimizes the angular deviation of the red, green, and blue component light beams, $b_r$, $b_g$, $b_b$, from the optical axis 619 while maintaining angular separation of the component light beams. To counter the angular deviations of the red, green, and blue component light beams caused by prism 606, prism 607 is formed of an optic material having substantially less dispersion than that of prism 606.

The combination of prism 606 and 607 is referred to as a "zero deviation prism." With respect to the green component, $b_g$, the prism 607 counters the angular deviation produced by prism 606 such that the green light beam, $b_g$, emerging from prism 607 is substantially parallel to the optical axis 619. However, blue light components, $b_b$, will have a negative angle with respect to the optical axis 619 and red light components, $b_r$, will have a positive angle with respect to the optical axis 619 after passing through prisms 606 and 607. In alternate embodiments, prisms 606 and 607 may provide, for example, dispersement of blue light components, $b_b$, at a positive angle with respect to the optical axis 619 and red light components, $b_r$, at a negative angle with respect to the optical axis 619.

After exiting prism 607, component light beams $b_r$, $b_g$, $b_b$ are directed to lenticular screen 608. Lenticular screen 608 converges and directs beams $b_r$, $b_g$, $b_b$ to the second lenticular screen 609 such that each lenslet in 609 receives the light from a particular lenslet in screen 608.

Lenticular screens 608 and 609 are separated by a distance, D. The distance, D, between lenticular screens 608 and 609 is chosen such that a particular band of light from a lenslet on screen 608 illuminates approximately one-third of a corresponding lenslet on lenticular screen 609 This occurs when the distance, D, is approximately the focal length of the lenslets in lenticular screen 608.

Because of their angular separation, the red, green, and blue beams, $b_r$, $b_g$, $b_b$, are brought to a focus position on the image display system 610 that is different for each of the beams, $b_r$, $b_g$, $b_b$. Thus, lenticular lens arrays 608 and 609 can be used to focus the angularly separated but substantially collimated light beams, $b_r$, $b_g$, $b_b$, emerging from prism 607, onto individual display cells on the image display 610.

Referring again to FIG. 5, an image display 220 is composed of rows and columns of display cells. Display cells, for example, display cells 221, 222, and 223, can be individually modulated with color component information by modulation circuitry 550 to represent an image. Referring back to FIG. 6, in the system 600, the image display 610 is a transmissive image display system. In a transmissive image display, each display cell can be individually modulated with color component information such that each display cell either substantially blocks or transmits the light energy through the display cell.

Light passing through the modulated display cells of the image display 610 is then focused by lenslets in lenticular screen 611 to corresponding lenslets in lenticular screen 612. The distance, D, between lenticular screens 611 and 612 is determined by the focal length of lenticular screen 612. The modulated light beams are then brought into coincidence by the zero deviation prism combination 613 and 614. The modulated light exiting prism 614 is then focused by projection lens system 650 for display on a screen or other projection surface 618. The projection lens system may include, for example, a condenser lens 615, an aperture 616, and one or more additional projection lens components 617. The projection lens system 650 produces on the screen 618 an image of the lenslets in the lenticular screen 612 colored by the modulated light beams passing through lenticular screen 612 as modulated by the image display system 610.

Image quality of both reflective 200 and transmissive 600 image projection systems may be improved by the use of anti-reflective coatings on optical elements in the systems. For example, the surfaces of lenses 202, 604, 615, and 617 may have an anti-reflective coating to reduce ghost images and image aberrations. Prisms and other elements of the image projection systems 200 and 600 may likewise have anti-reflective coatings. Furthermore, closely placed optical surfaces such as the faces of prisms 215 and 216, and of 606 and 608, and of 613 and 614 may be joined with an optical cement to improve optical coupling and image quality. Additionally, lenslets on a lenticular screen need not be distinct elements, but may be defined in relation to a particular group of display cells in the image display systems. For example, a lenslet on a lenticular screen may be defined to be that portion of the lenticular screen that directs light to an area of an image display system that includes one red display cell, one green display cell, and one blue display cell, for example, display cells 221, 222, 223 (FIG. 5).

The image display systems 220 and 610 may include many hundreds or thousands of rows and columns of display cells. The display cells may be, for example, active matrix liquid crystal display cells or may be cells formed using a matrix of nonlinear devices on a glass or fused silica substrate which can be opaque, such as may be provided by single crystal silicon. Also, a matrix of transistor structures may be used. The nonlinear devices allow individual control over each display cell. The matrix devices are often amorphous or polycrystalline silicon thin film transistors; however, thin film diodes and metal-insulator-metal devices have been employed. CMOS semiconductor devices may also be used.

Lenses and prisms in the image projection systems 200 and 600 may be replaced by, for example, Fresnel lenses and Fresnel prisms or other optical components providing for the separation of a composite light beam into angularly separated color component beams and for the joining of angularly separated color component beams into a coherent light beam for projection.

The foregoing descriptions are illustrative. Many changes may be made to the described embodiment. For example, although the invention has been described as using three color component beams, red, green, and blue, implementations of the invention may use a greater or lesser number of component beams and may use component beams having additional frequency ranges. Additionally, although the invention has been described as using prisms and lenses, these components may be substituted for by optical components providing equivalent light dispersing, merging, and directing functionality. The invention should be limited only as set forth in the claims that follow.

What is claimed is:

1. An image projection system, comprising:
   a light dispersing system arranged in a path of a first composite light beam for separating the first composite light beam into a first component beam having a first spectra, a second component beam having a second spectra, and a third component beam having a third spectra;
   one image display panel arranged in the paths of the first component beam, the second component beam, and the third component beam, the image display panel comprising a first display cell modulating the first component beam, a second display cell modulating the second component beam, and a third display cell modulating the third component beam; and
   a beam merging system producing a second composite light beam by merging the modulated first component beam, modulated second component beam, and modulated third component beam.

2. The image projection system of claim 1 further comprising a light source assembly for producing the first composite light beam and a projection lens system arranged in a path of the second composite light beam for projecting the second composite light beam.

3. The image projection system of claim 1, wherein the first display cell, the second display cell and the third display cell comprise display cells that vary in reflectivity upon application of an input.

4. The image projection system of claim 3 wherein the axis of the first composite light beam and the axis of the second composite light beam are not parallel.

5. The image projection system of claim 1, wherein the first display cell, the second display cell, and the third display cell comprise display cells that vary in transparency upon application of an input.

6. The image projection system of claim 5 wherein the axis of the first composite light beam is parallel to the axis of the second composite light beam.

7. The image projection system of claim 1, wherein the light dispersing system comprises a first prism.

8. The image projection system of claim 7, wherein the light dispersing system comprises a second prism and wherein the first prism and the second prism act as a zero deviation prism.

9. The image projection system of claim 1, wherein the light dispersing system comprises a lenticular screen.

10. The image projection system of claim 1, wherein the light dispersing system and the component beam merging system are a single system.

11. The image projection system of claim 1, wherein said image display panel comprises a display cell modulation circuit.

12. A method of projecting a color image, comprising:
    dispersing a first composite light beam to produce a spatially separated first component beam, second component beam, and third component beam wherein the first component beam has a first spectra, the second component beam has a second spectra, and the third component beam has a third spectra;
    directing the first component beam to a first display cell on a surface of one image display panel;
    directing the second component beam to a second display cell on the surface of the image display panel;
    directing the third component beam to a third display cell on the surface of the image display panel;
    modulating the first display cell to produce a first modulated component beam;
    modulating the second display cell to produce a second modulated component beam;
    modulating the third display cell to produce a third modulated component beam; and
    producing a second composite light beam by merging the first modulated component beam, the second modulated component beam, and the third modulated component beam.

13. The method of claim 12 wherein dispersing the first composite light beam comprises using a prism.

14. The method of claim 12 wherein directing the first component beam, directing the second component beam, and directing the third component beam comprises using a lenticular screen.

15. The method of claim 12 wherein modulating the first display cell, modulating the second display cell, and modulating the third display cell comprises varying the reflectivity of the display cells.

16. The method of claim 12 further comprising projecting the second composite light beam.

17. The method of claim 12 wherein modulating the first, second, and third display cells comprises individually varying the transparency of the first display cell, the second display cell, and the third display cell.

18. An image projection system, comprising:
    a light dispersing apparatus arranged in a path of a first composite light beam for separating the first composite light beam into a first component beam having a first spectra, a second component beam having a second spectra, and a third component beam having a third spectra;
    a single image display panel arranged in the paths of the first component beam, the second component beam, and the third component beam, the image display panel including a first display cell modulating the first component beam, a second display cell modulating the second component beam, and a third display cell modulating the third component beam; and
    a beam merging apparatus producing a second composite light beam by merging the modulated first component beam, the modulated second component beam, and the modulated third component beam,
    wherein the light dispersing system is linearly arranged along an optical axis.

19. The image projection system of claim 18, wherein the single image display panel and the beam merging apparatus are linearly arranged along the optical axis.

20. The image projection system of claim 18, wherein the first display cell, the second display cell and the third display cell include display cells that vary in reflectivity upon application of an input.

21. The image projection system of claim 20, wherein the light dispersing apparatus and the beam merging apparatus are a single apparatus.

22. The image projection system of claim 18, wherein the first display cell, the second display cell and the third display cell include display cells that vary in transparency upon application of an input.

23. The image projection system of claim 18, wherein the first component beam is a red component beam, the second component beam is a blue component beam, and the third component beam is a green component beam.

24. A method of projecting a color image, comprising:

dispersing a first composite light beam using a dispersing system linearly arranged along an optical axis to produce a first component beam, a second component beam, and a third component beam wherein the first component beam has first spectra, the second component beam has a second spectra, and the third component beam has a third spectra;

directing the first component beam to a first display cell on a surface of a single image display panel;

directing the second component beam to a second display cell on the surface of the single image display panel;

directing the third component beam to a third display cell on the surface of the single image display panel;

modulating the first display cell to produce a first modulated component beam;

modulating the second display cell to produce a second modulated component beams;

modulating the third display cell to produce a third modulated component beam; and producing a second composite light beam by merging the first modulated component beam, the second modulated component beam, and the third modulated component beam.

* * * * *